UNITED STATES PATENT OFFICE.

V. M. GRISWOLD, OF LANCASTER, OHIO.

BITUMINOUS GROUND FOR PHOTOGRAPHIC PICTURES.

Specification forming part of Letters Patent No. 15,924, dated October 21, 1856; Reissue No. 430, dated February 24, 1857.

*To all whom it may concern:*

Be it known that I, VICTOR M. GRISWOLD, of Lancaster, in the county of Fairfield, State of Ohio, have invented a Bituminous Ground for Photographic Pictures, of which the following is a specification.

My improvement consists in the preparation of sensitive bitumen by the following process:

First. Make an asphaltum-varnish by boiling one-half gallon linseed-oil, one pint of Japan varnish, and five or six ounces of asphaltum to such a consistency that it will, when cool, roll into a hard ball. Dilute this to a proper consistency with spirits of turpentine, and the compound will be prepared bitumen. To eight (8) ounces of spirits of turpentine add slowly and in minute doses (as they combine with great heat) one-half ounce bromine and one ounce of iodine. This compound, when thoroughly united, is bromo-iodized turpentine. To a half-gallon bath of the prepared bitumen add eight ounces of the bromo-iodized turpentine, and the compound will be sensitized bitumen.

Second. Take finely-pulverized bromide of potassium, one hundred and fifty grains. Add to it one hundred and fifty grains crystallized nitrate of silver dissolved in four ounces of pure soft water, and bromide of silver will be precipitated. Wash the precipitate through nine or ten changes of pure soft water. Filter dry in a dark place. Put the dry powder into a long eight-ounce vial containing four to six ounces spirits of turpentine, and add to it one and a half ounce of iodide of potassium very finely pulverized. This will form the bromo-iodide of potassium and silver in turpentine, which add to a half-gallon of prepared bitumen, and the compound will be sensitized bitumen.

Bitumen sensitized in either of the above modes will give impressions without the use of collodion.

What I claim as my invention, and desire to secure by Letters Patent, is—

Sensitized bitumen prepared as above, for the purpose of taking photographic impressions on paper, metallic sheets, or other substance.

V. M. GRISWOLD.

Witnesses:

JNO. RADEBAUGH,

JOSEPH REINMUND.